Jan. 27, 1970 R. L. BILLINGSLEY ET AL 3,492,439

TELEPHONE SIGNALLING CIRCUIT

Filed Nov. 10, 1965

Inventors:
Robert L. Billingsley
Virgle E. Porter
By Hume, Groen, Clement & Hume Attys.

United States Patent Office 3,492,439
Patented Jan. 27, 1970

3,492,439
TELEPHONE SIGNALLING CIRCUIT

Robert L. Billingsley, Elmhurst, and Virgle E. Porter, Country Club Hills, Ill., assignors to Amtron, Inc., Midlothian, Ill., a corporation of Illinois Filed Nov. 10, 1965, Ser. No. 507,212
Int. Cl. H04m *1/74*
U.S. Cl. 179—84 6 Claims

ABSTRACT OF THE DISCLOSURE

There is disclosed a telephone switching circuit comprising a plurality of paths wherein said switching circuit provides a low impedance to DC and substantially higher impedance to AC.

This invention relates to telephone communications systems and more particularly to imporved circuitry for effecting DC signalling in such systems without inhibiting the information transmission characteristics thereof.

It is an object of this invention to provide an improved circuit for effecting DC signalling in telephone transmission systems.

It is a further object of the present invention to provide a closure circuit for use in telephone transmission systems so that DC signalling can be reliably effected without adversely influencing the AC or information transmission characteristics of such systems.

Still another object of the present invention is to provide a low impedance DC signalling network for use in telephone transmission systems whereby energy losses, distortive transients and bridging losses in such systems are substantially minimized.

An additional object of the present invention is to provide a signalling circuit for use with telephone transmission systems, which circuit yields a stable and low impedance to DC signals and a high AC impedance which is essentially insensitive to frequency variations encountered during the transmission of voice or other AC information signals.

Other objects and advantages of the present invention will become apparent from the following description, particularly when considered in conjunction with the accompanying drawing wherein.

Referring generally to the drawings, the present invention is directed to a DC closure or signalling circuit for use in conjunction with telephone transmission systems. As will be appreciated by those skilled in the art, such signalling circuits which in the past have principally taken the form of an inductive reactance, function to transmit DC signals that are used for various signalling purposes (e.g., conditioning automatic equipment for subsequent dialing operations, indicating off-hook conditions, transmitting dial pulses to automatic equipment, etc.). It is important that the functions carried out by such signalling circuits do not substantially inhibit the transmission of voice or AC information signals in the telephone system. Accordingly, the signalling circuits of the present invention are designed to yield a low impedance to DC signals and a substantially higher blocking impedance to any AC informational signals, while at the same time minimizing energy losses, distortive transients and/or bridging losses.

Figure 1:
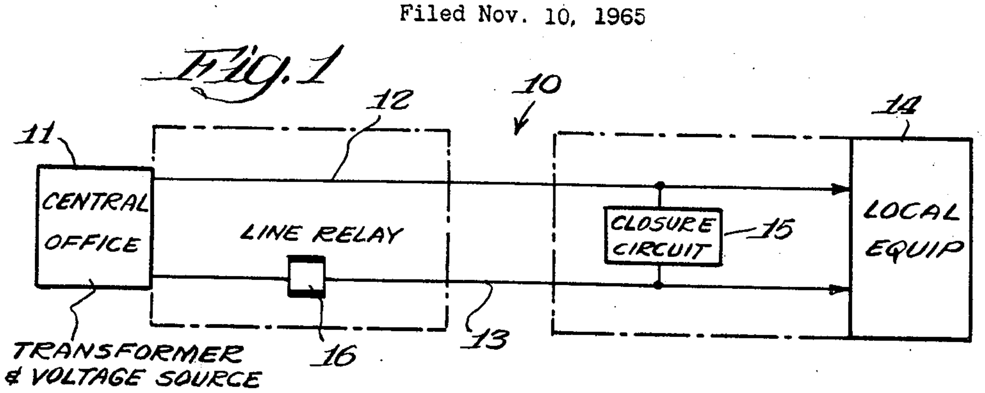
FIGURE 1 is a simplified block diagram of a portion of a telephone transmission system incorporating a DC closure or signalling circuit as contemplated by the present invention.

FIGURE 1 is a simplified representation of a portion 10 of a telephone transmission system wherein the DC closure or signalling circuits of the present invention are suitably employed with the highly desirable results generally outlined above. This illustrated portion of the telephone system is shown as including a central office 11 which, in a conventional manner, includes means for receiving and transmitting AC voice or information signals by way of transmission lines 12 and 13. The transmission lines 12 and 13 link the office 11 with local equipment apparatus 14, which might be a single telephone handset, a switchboard, etc. As will be fully appreciated by those skilled in the art, the simplified representation of FIGURE 1 is illustrative of only one segment of a typical telephone communications system, and such a system would normally include a multiplicity of such individual transmission circuits as represented by the lines 12 and 13 and the local equipment 14.

As shown in FIGURE 1, a signalling or closure circuit 15 is connected in circuit between the transmission lines 12 and 13 and in parallel relationship with the local equipment 14. In addition, a signalling relay 16 of conventional design is connected in series with the transmission line 13. In accordance with the invention; the circuit 15 provides a signal path to energize the relay 16 and/or carry out other signalling functions incident to the initiation and termination of a period of transmission (i.e. a voice communication) between the local equipment 14 and the central office or other local equipment. In this connection, the office 11 is, in a conventional manner, provided with the necessary transformer means to effect the transmission of voice or other AC information signals along with a direct current source (e.g. a battery) for supplying direct current energy through the closure circuit 15 at appropriate times prior to, during and subsequent to a transmission interval so that the relay 16 and other system components (e.g. automatic dialing units) are suitably actuated without interfering with or inhibiting voice transmission.

Figure 2:
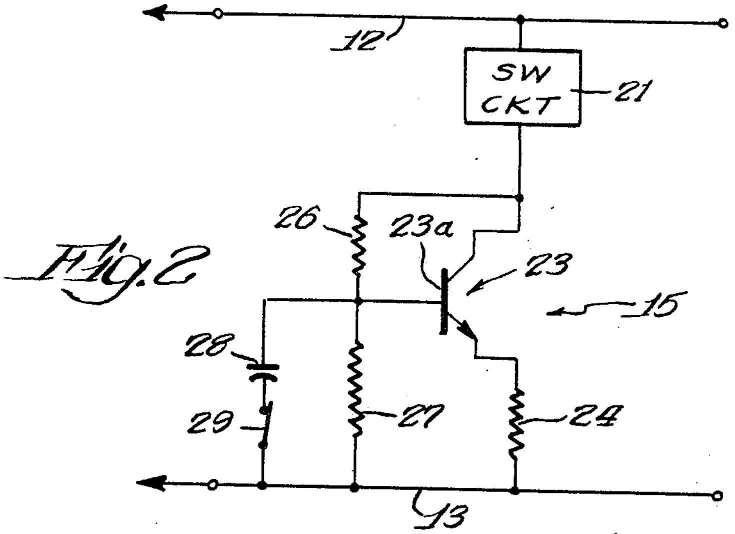
FIGURE 2 is a schematic illustration of one embodiment of a signalling or closure circuit of the type diagrammatically illustrated in FIGURE 1.

FIGURE 2 depicts one embodiment of a signalling circuit 15 contemplated by the present invention. The illustrated circuit, which is a two terminal network that eliminates the need for inductors to effect desired signalling, includes a conventional form of switching circuit 21 that is connected in series with a transistor circuit including an NPN transistor 23 and its associated biasing circuitry. In operation, the circuit 15 provides a high AC impedance (e.g. in excess of 6000 ohms) and a low DC impedance (e.g. approximately 200 ohms) across the lines that supply the local equipment, which equipment is typically an open circuit to DC signals but offers several hundred ohms impedance to AC signals.

Referring more specifically to FIGURE 2, a voltage divider formed by a resistor 26 and a resistor 27 is connected across the collector-base junction and the base-emitter circuit including a resistor 24. More specifically, the junction of the resistors 26 and 27 is connected to the base 23*a* of the transistor 23, and the series combination of a capacitor 28 and a normally closed switching element 29 are connected to this same junction in parallel with the resistor 27.

Figure 3:
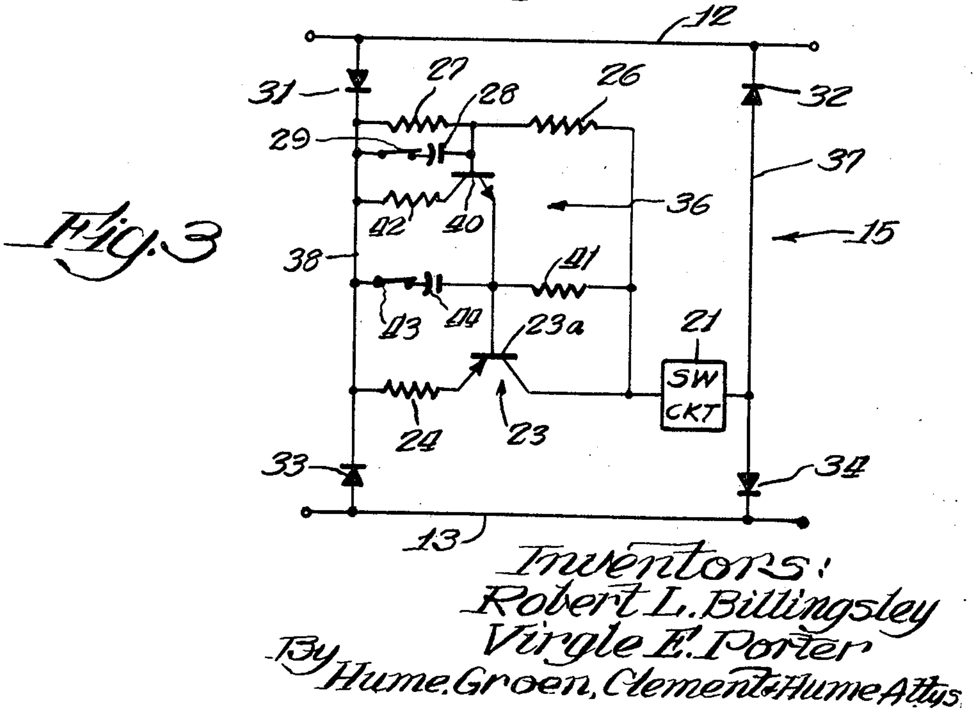
FIGURE 3 is a schematic illustration of an alternate embodiment of the circuit depicted in FIGURE 2.

To facilitate a clear and complete understanding of the operation and advantages of the embodiments of the signalling circuit as shown in both FIGURES 2 and 3, the present description is directed to the functioning of these circuits when the local equipment 14 is a single, dial equipped telephone handset. Under these circumstances, it will be appreciated that the switching circuit 21 includes a series arrangement of normally open hook switch contacts and normally closed dial mechanism contacts and that the contact 29 is associated with a dial pulse relay so that the capacitor 28 is removed from the circuit during dialing intervals.

When the handset is resting in the cradle provided for its reception, the hook switch contacts are in an open condition and the switching circuit 15 does not provide any path for direct current between the transmission lines 12 and 13. However, when the handset is raised from the cradle, the normally open contacts of the hook switch close, thereby rendering the transistor 23 conductive. As hereinafter more fully described, the transistor 23 is rendered conductive as a result of the application of DC biasing potential thereto through the lines 12 and 13. As a result, direct current flows through the signalling circuit 15 so as to energize the line relay 16. Typically, the energization of the line relay 16 conditions the central office equipment for operation so that a call can be initiated. For example, the line relay effects the actuation of automatic dialing equipment so that a call can be placed in response to the actuation of the dialing mechanism associated with the handset.

In this latter connection, each time the dial mechanism (not shown) associated with the handset is actuated the normally closed dial mechanism contacts are opened thereby supplying a number of DC pulses (i.e. the flow of direct current through the circuit 15 is selectively interrupted) and the necessary dialing function is carried out by the central office equipment that is responsive to the dialing pulses. Once the dialing function is completed and voice transmission is initiated, the closure circuit functions to maintain the line relay in an energized state but does not inhibit or adversely affect the voice communication.

Notwithstanding the specific type of switching arrangement 21 employed in the closure circuit 15, it will be appreciated that this circuit functions essentially as a two terminal impedance element designed to satisfy and complement the optimum DC and AC operating characteristics of a telephone system employing same. In this connection, a full appreciation for the factors that dictate and the manner of selecting the proper components for specific embodiments and/or applications of the closure circuit 15 can be gained from related aspects of the design criteria for this two-terminal network.

Firstly, it will be appreciated that typical closure circuit operating conditions dictate a value of minimum tolerable signalling current ($I_s$) that must be achieved and maintained in order to effect DC signalling with a minimum anticipated line voltages ($E_L$) established across the closure circuit 15. This then dictates a maximum DC closure circuit impedance ($Z_{cc}$); where $$Z_{cc}=\frac{E_L}{I_s}$$

Having established such a maximum DC impedance value, a basis then exists for selecting the values of the resistor 24 ($R_{24}$), the resistor 26 ($R_{26}$) and the resistor 27 ($R_{27}$), all of which contribute to the value of $Z_{cc}$. Without detailing the derivation of this relationship, which is dictated to a substantial degree by the characteristics of the transistor 23, it will be appreciated that the values for these resistors and the total DC impedance of the circuit 15 are related as follows:

$$Z_{cc}=\frac{R_{26}+R_{27}}{R_{27}+R_{24}}(R_{24})$$

More specifically and although the derivation of the above relationship has not been specifically set forth, those skilled in the art will appreciate that it is premised directly on design criteria which dictate a direct current path defined by the transistor 23 in series with the resistor 24, thereby necessarily assuming the selection of a high beta ($\beta$) transistor with essentially zero voltage drop across the base-emitter junction thereof.

With more specific reference to the interrelationship of the resistors 24, 26, 27, and as more fully hereinafter set forth, the value of the resistor 26 ($R_{26}$) is dictated in significant part by the desired minimum value of AC impedance offered by the circuit 15. Giving due consideration to this value and the anticipated circuit conditions which lead to its selection, the selection of the value for the resistor 27 follows bearing in mind both the desired transistor biasing conditions essential to proper circuit operation and the peak AC signals that might typically be encountered by the closure circuit 15. With the values for $R_{26}$ and $R_{27}$ thus established and with knowledge of the tolerable lower limits for both the necessary DC signalling current and the applied DC line voltage, the selection of the appropriate value for the resistor $R_{24}$ is effected.

A correlated approach to the foregoing design considerations, clearly indicates that the proper selection of the resistive components of the circuit 15 cannot be premised solely on either AC or DC operating conditions. Accordingly, a complementary aspect to the proper selection of the components for the closure circuit 15 is the establishment of tolerable limits for the values derived from the relationships outlined above, with specific consideration being given to the maintenance of both a minimum AC impedance characteristic for the overall closure circuit and a maximum DC impedance characteristic.

In this latter connection and with the appropriate selection of the transistor 23, the biasing resistor 26 in series with the capacitor 28 forms one of the two parallel branches defined by the closure circuit when alternating current signals are being supplied through the lines 12 and 13. Accordingly, the impedance value appropriate for this resistor (i.e. an impedance value that will have the minimum effect on the transmitted AC signals) is preferably selected to be at least ten times the alternating current line impedance including the local equipment 14 (e.g. approximately 6000 ohms).

The resistor 27 is similarly selected for optimum closure circuit operation. The maximum value of this resistive element is preferably selected so that the transistor 23 is precluded from going into saturation during operation of the closure circuit. Conversely, the minimum value of this element is dictated by the biasing conditions that must be established in order to maintain the transistor 23 in a conductive state under minimum line voltage input conditions. The selection of an optimum value for the resistor 27 is also influenced by the inherent nonlinear characteristics of the transistor stemming from unequal voltage drops developed across this resistor 27 and the resistor 24.

To complement the selection of the other parameters for the control circuit, the resistor 24 is also selected with an optimum impedance value in mind. To this end, the resistance of the resistor 24 should not exceed a maximum impedance value which is dictated by the amount of signal current necessary to maintain the relay 16 and other direct current responsive devices in an energized state during DC signalling operations. On the other hand, the minimum impedance value of this resistor is dictated by the amount of impedance necessary to establish a minimum tolerable impedance characteristic for the second parallel branch of the closure circuit during the transmission of AC information to and from the equipment 14 (i.e. that path defined by the transistor 23 including the collector impedance $r_c$ thereof). In this latter connection and as is well-known to those skilled in the art, the amount of emitter impedance has a direct effect on the AC impedance characteristics of a transistor. Accordingly, if the resistance of the element 24 is below a minimum tolerable value, the desired high AC impedance characteristics of the closure circuit, as dictated by the impedance of the transistor 23, is adversely influenced. With the foregoing design considerations satisfied and having selected a transistor having parameters which complement the values selected for the biasing and current limiting resistors associating therewith, an equivalent direct current impedance of less than 200 ohms is established by the closure circuit 15. That is, a preferred design for the circuit 15 is such that preferably approximately forty milliamps of current flow through the resistor 24 with an applied line voltage of approximately eight volts. This operational mode contemplates a voltage drop of approximately two volts across the resistor 27 and a total DC impedance value of approximately 200 ohms. In this latter connection, the series impedance offered by the transistor 23 and resistor 24 is shunted by the voltage divider network which has a sufficiently high impedance value so that its effect on the DC circuit can be ignored.

On the other hand, and because of the AC impedance characteristics of the transistor 23 when not operating in saturation (e.g. a high $r_c$), a nonreactive, alternating current impedance value of approximately 6000 ohms is provided by the closure circuit, with AC impedance value being dictated essentially by the value of the resistor 26. Assuming a typical AC line impedance value of 600 ohms including local equipment, it will be appreciated that any bridging losses stemming from the presence of the closure circuit are minimal. Moreover, because of the nonreactive characteristics of the closure network this unit is substantially insensitive to frequency variations, subject of course to the frequency sensitivity that may be exhibited by the transistor 23.

In this latter connection and because commercially available transistors when employed in the circuit of FIGURE 2 tend to exhibit a nonlinear DC impedance characteristic due to differences in the voltage drop across the resistors 27 and 24, the amount of DC impedance offered by the closure circuit when employing such transistors is subject to some variation which is objectionable in various applications of the closure circuits of the present invention. Accordingly, although it may be desirable to use the simplified circuit shown in FIGURE 2, practical considerations under specific operating conditions and/or in a particular system may dictate the use of a modified embodiment of the closure circuit 15, particularly as depicted in FIGURE 3.

The embodiment shown in FIGURE 3 corresponds essentially to that of FIGURE 2 with the exception that an emitter follower circuit 36 is incorporated in the base circuit of the transistor 23 so as to accommodate a voltage drop in this base circuit and lead to essential equivalent voltage drops across the resistors 24 and 27. Under these circumstances, the closure circuit 15 exhibits a constant DC impedance characteristic without sacrificing the desirable high impedance AC characteristics of the circuit.

Referring to FIGURE 3, wherein components corresponding to those of FIGURE 2 are designated by the same numerals, this embodiment of the closure circuit 15 includes a bridge rectifier defined by diodes 31, 32, 33 and 34 that are connected in circuit with the lines 12 and 13 so as to render the circuit 15 polarity insensitive. As shown, the switching circuit 21 is connected between a conductor 37 that joins the diodes 32 and 34 and the collector of the transistor 23. Similarly the PNP transistor 23, the resistors 24, 26 and 27, the capacitor 28 and the contact 29 are connected in circuit with the switching circuit 21 and a conductor 38 that joins the diodes 31 and 33. In this connection, the arrangement of these latter circuit components between the conductors 37 and 38 corresponds to the embodiment of FIGURE 2.

However and as generally outlined above, an emitter follower circuit 36 is incorporated in the base of the transistor 23. That is, the base of an NPN transistor 40 is connected to the junction of the resistors 26 and 27. The emitter of this transistor is connected to the base of the transmitter 23 along with a biasing resistor 41 that is connected between the base and collector of the transistor 23. The collector of the transistor 40 is connected to the conductor 38 through a resistor 42 as is a normally closed dial pulse relay contact 43. As shown, a capacitor 44 is connected between the contact 43 and the junction of the resistor 41 with the emitter and base, respectively, of the transistors 40 and 23.

In an operational manner generally similar to that of the embodiment depicted in FIGURE 2, the closure circuit 15 as shown in FIGURE 3 provides a relatively low impedance path for DC signals which includes the switching circuit 21, the transistor 23 and the resistor 24. As with the previous embodiment, the impedance offered by these components is substantially less than the impedance of the parallel combination of other circuit components forming the closure circuit including the resistors 26 and 41 which are relatively large resistors. Accordingly, the impedance characteristics of this remaining circuitry can, from an operational standpoint, be essentially neglected from the standpoint of DC signals.

However, the circuit 36 formed by the transistor 40 and its associated biasing elements contributes significantly to optimum closure circuit operation because the emitter follower action of the transistor 40 causes the transistor 23 to function essentially as a linear DC resistance element. More specifically and during DC operation of the closure circuit, a voltage drop is developed across the base-emitter diode junction of the transistor 40 so that essentially equal voltages are established across the resistors 24 and 27. Consequently, the nonlinear characteristic of the transistor 23 is compensated for by the action of the transistor 40, and the DC impedance path offered by the closure circuit has the highly desirable operational characteristics of stability and linearity.

The addition of the emitter follower circuit 36 also contributes to the desired AC impedance characteristics of the closure circuit 15 as depicted in FIGURE 3. That is the AC impedance path of the closure circuit can include larger resistors 26 and 41 so as to yield an AC impedance which is higher than the AC impedance yielded by the embodiment of the closure circuit shown in FIGURE 2. As will be appreceiated by those skilled in the art, the AC impedance path defined by the closure circuit as depicted in FIGURE 3 includes the series combination of the resistor 26 and capacitor 28 in parallel with the resistor 41 and capacitor 44. By selecting the value of the resistors 26 and 41 to be at least twice as large as the value of the resistor 26 in the embodiment disclosed in FIGURE 2, the desired AC impedance characteristics are readily achieved. A limiting value is imposed on the resistor 41 since this resistor establishes DC bias for the transistor 23. Accordingly, too large a value for the resistor 41 may result in an undesirable diminishment in the DC signalling current.

The following illustrates the components and parameters of one preferred embodiment corresponding to that depicted in FIGURE 3:

Transistor 23—2N1538
Resistor 24—One (1) 26 ohm, 2 watt resistor, or two (2) parallely connected 51 ohm, 1 watt resistors
Resistor 26—24K ohm resistor
Resistor 27—3.6K ohm resistor
Capacitor 28—22 microfarad capacitor
Diodes 31, 32, 33, and 34—IN645 diodes
Transistor 40—2N1308
Resistor 41—12K ohm resistor
Resistor 42—47 ohm resistor
Capacitor 44—100 microfarad capacitor A circuit as described above can be satisfactorily employed even in systems which are otherwise characterized by highly undesirable operating parameters. For example, in a telephone system providing approximately 400 ohms impedance in the central office and 1400 ohms impedance in the loop, the closure circuit provides at least 20 milliamps of signalling current when supplied from a 46 volt battery. These highly desirable DC operating characteristics of the closure circuit are complemented by an AC impedance characteristic of at least approximately ten times the AC line impedance of the system including the local equipment with which the closure circuit operates.

From the foregoing it will be appreciated that the present invention provides an improved form of closure circuit particularly suitable for use in telephone communication systems. Although FIGURES 2 and 3 depict the preferred and perhaps the most practical forms of such closure circuits, it will be appreciated that various modifications in the circuitry represented by these two embodiments might be devised by those skilled in the art without departing from the invention. In this latter connection, the desirable results achieved through the use of the emitter follower 36 might also be accomplished through the use of a semiconductor diode. It should be noted that the closure circuit can also be adapted for other similar uses in telephone communication systems such as, for example, the electronic telephone switching system disclosed in Patent No. 3,204,044.

In any event, both the use of the closure circuit in a variety of different telephone systems of the type outlined above and the modifications in the closure circuit which are incidental to rendering it suitable for use in such systems clearly would not constitute a departure from the invention as set forth in the accompanying claims.

What is claimed is:

1. A circuit for effecting DC signalling in telephone communications systems without inhibiting the AC or information transmission characteristics of such systems, which signalling circuit comprises a switching means, and means connected in circuit with said switching means for defining a plurality of paths in response to the actuation of such switching means and the application of direct current to said signalling circuit, said last mentioned means including a selectively conductive circuit element and circuit means for rendering said circuit element conductive in an operational mode to provide a low impedance to direct current and a substantially higher impedance to alternating current.

2. A signalling circuit in accordance with claim 1 and wherein said circuit element is a transistor and said circuit means includes the biasing circuitry for said transistor.

3. A signalling circuit in accordance with claim 2 and wherein an emitter follower is connected in the base circuit of said transistor so as to render said transistor an essentially linear impedance element in the low impedance path defined for direct current by said signalling circuit.

4. In a telephone communications system including a first station for receiving and transmitting AC voice or information signals by way of at least a pair of transmission lines and a second station for similarly receiving and transmitting said signals by way of said transmission lines and wherein said first station includes means for transmitting direct current signal information indicative of the operative state of said first and second stations, a closure circuit connected across said transmission lines; said closure circuit providing a low impedance path to transmitted DC signals without inhibiting the AC transmission between said first and second stations and comprising a switching means, and means connected in circuit with said switching means for defining a plurality of paths in response to the actuation of such switching means and the application of direct current to said closure circuit, said last mentioned means including a selectively conductive circuit element and circuit means for rendering said circuit element conductive in an operational mode such that a plurality of paths are defined by said circuit element and said circuit means in direct response to said applied signals whereby said closure circuit offers a low impedance to direct current and substantially higher impedance to alternating current.

5. A closure circuit for use in a telephone communications system as defined in claim 4 and wherein said circuit element is a transistor and said circuit means includes the biasing circuitry for said transistor.

6. A closure circuit for use in a telephone communications system as defined in claim 5 and wherein an emitter follower is connected in the base circuit of said transistor so as to render said transistor an essentially linear impedance element in the low impedance path defined for DC by said closure circuit.

References Cited

UNITED STATES PATENTS

| | | |
|---|---|---|
| 2,808,462 | 10/1957 | Meacham. |
| 2,818,470 | 12/1957 | Busala et al. |
| 3,170,043 | 2/1965 | Hohmann. |

W. C. COOPER, Primary Examiner

U.S. Cl. X.R.

179—16

FO-1050
(5/69)

UNITED STATES PATENT OFFICE

CERTIFICATE OF CORRECTION

Patent No. 3,492,439 Dated

Inventor(s) R. L. Billingsley and Virgle E. Porter

It is certified that error appears in the above-identified patent and that said Letters Patent are hereby corrected as shown below:

Column 1, line 19 of printed patent - delete "imporved" and substitute --improved--

Column 5, line 44 of printed patent - delete "essential" and substitute --essentially--

SIGNED AND SEALED
AUG 25 1970

(SEAL)
Attest:

Edward M. Fletcher, Jr.
Attesting Officer

WILLIAM E. SCHUYLER, JR.
Commissioner of Patents